C. A. CARTER.
VALVE.
APPLICATION FILED JUNE 9, 1917.
1,325,189.
Patented Dec. 16, 1919.
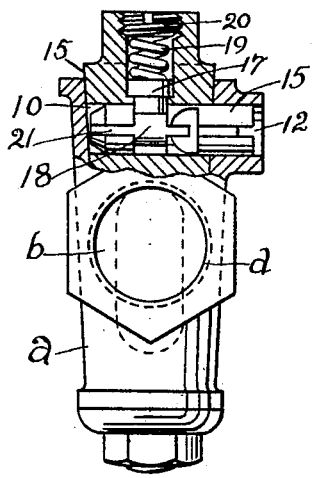
Fig. 1.
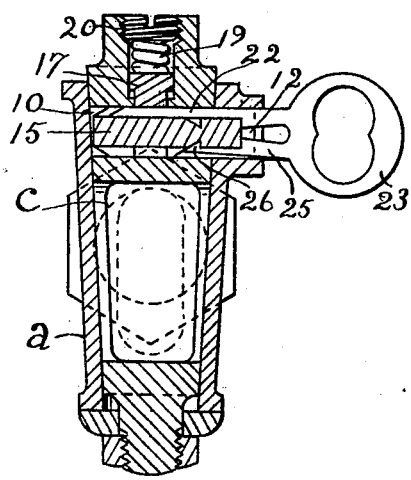
Fig. 2.
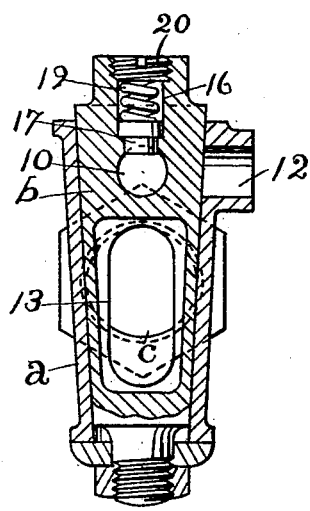
Fig. 3.
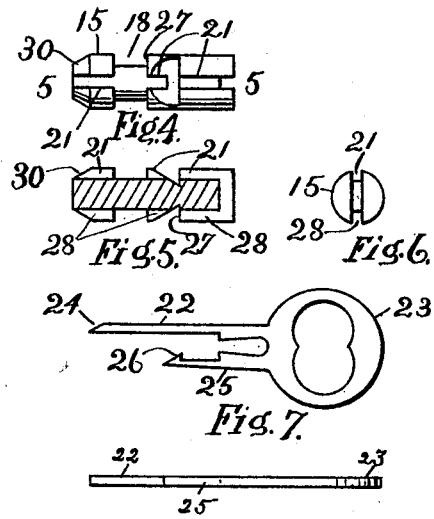
Fig. 4.
Fig. 5.
Fig. 6.
Fig. 7.
Fig. 8.
INVENTOR.
Charles A. Carter
by Jas. H. Churchill
atty.

UNITED STATES PATENT OFFICE.

CHARLES A. CARTER, OF LYNN, MASSACHUSETTS.

VALVE.

1,325,189.     Specification of Letters Patent.     Patented Dec. 16, 1919.

Application filed June 9, 1917. Serial No. 173,743.

*To all whom it may concern:*

Be it known that I, CHARLES A. CARTER, a citizen of the United States, and a resident of Lynn, in the county of Essex and State of Massachusetts, have invented an Improvement in Valves, of which the following description, in connection with the accompanying drawings, is a specification, like characters on the drawings representing like parts.

This invention relates to a valve and has for its object to provide the same with simple and efficient means for locking the valve so as to render the latter incapable of being changed by unauthorized persons. The valve may be of any suitable or desired construction and may be a water, gas or other valve.

In the present instance the invention is shown as embodied in a rotary plug valve having its casing provided with an opening with which coöperates an opening in the valve proper, the said openings registering with each other when the valve is in the position in which it is desired that it should be locked.

The openings referred to have inserted into them a device, preferably in the form of a pin which serves to establish a substantially fixed relation between the valve and its casing.

Provision is made for locking said device or pin against removal by unauthorized persons, and provision is also made for unlocking said device or pin so as to permit it to be removed from the openings by authorized persons.

These and other features of this invention will be pointed out in the claims at the end of this specification.

Figure 1 is an elevation with parts broken away of one form of valve embodying the invention and showing the same in its locked condition.

Fig. 2, a vertical section of the valve, showing the locking device about to be withdrawn from the valve.

Fig. 3, a vertical section of the valve unlocked and in a different condition from that shown in Fig. 1.

Fig. 4, an elevation of the locking pin removed from the valve.

Fig. 5, a section on the line 5—5, Fig. 4.

Fig. 6, an end elevation of Fig. 4 looking toward the left.

Fig. 7, an elevation of the releasing device or key, and

Fig. 8, a plan view of Fig. 7.

In the present instance, I have shown the invention as embodied in a rotary valve of known construction and comprising the valve casing *a* and the valve proper or movable member *b*, which latter is fitted to turn in the casing *a* and control communication between the inlet and outlet ports *c*, *d*, of said casing in a manner well understood.

The plug valve *b* is provided with a transverse opening 10 which is designed to register with an opening 12 in the casing *a*, when the valve *b* is in the position in which it is desired that it should be locked against turning by unauthorized persons.

In the present instance, the opening 10 is located in the valve plug *b* above the port or passage 13 and is arranged so that when the passage 13 connects the ports *c*, *d*, to open the valve, the opening 10 will be put out of alinement with the opening 12 in the casing as represented in Fig. 3. When the valve member *b* is turned to close the valve, as represented in Figs. 1 and 2, the opening 10 registers with the opening 12, and is capable of receiving a device herein shown as a pin 13, which is made of sufficient length to have its rear end within the opening 12 when the pin has been inserted into the opening 10, so as to prevent rotation of the valve member or plug *b*.

Provision is made for locking the pin 15 against withdrawal by unauthorized persons, and to this end, the valve member *b* is provided with an opening or chamber 16, which communicates with the transverse opening 10, and contains a plug or device 17, which is capable of projecting into the opening 10 and into a socket in the pin 15, said socket being shown as an annular groove 18 (see Figs. 1, 4 and 5). The locking plug 17 may be held in the groove or socket 18 by gravity, or as is preferred it may be held therein by a spring 19 located in the chamber 16 which is provided with a removable cap or nut 20.

Provision is made for removing the locking plug 17 from its socket 18 so as to unlock the pin 15 and permit the latter to be withdrawn.

To this end, the pin 15 is provided with a longitudinal slot or groove 21 for the reception of a bar or member 22 on a key 23, said member having a beveled front end 24, which is designed to engage the bottom of the plug 17 and lift the latter from its socket or groove 18, and into the position shown in Fig. 2, in which position, the plug rests on the upper surface of the member 22 and leaves the pin 15 free to be withdrawn, which may be accomplished by a second member 25 of the key 23, which second member is provided with a hook 26 (see Fig. 7), which is designed to engage a shoulder 27 on the pin, and when so engaged the hooked member draws the pin 15 out of the openings 10, 12, and leaves the valve b free to be turned. The hooked member 25 is movable in a longitudinal groove or slot 28 in the pin 15, and the latter is provided with a beveled front end 30, which is designed to engage the bottom of the plug 17 and lift it out of the opening 10 when the pin 15 is inserted into the said opening.

In the present instance the valve is shown as locked when in its closed position, but it is evident that the valve may be arranged to be locked in its open position, by merely arranging the opening 10 substantially at right angles to the position it now occupies.

I have herein shown one embodiment of the invention, but it is not desired to limit the invention to the particular construction shown.

Claims:

1. In a device of the character described, in combination, a valve casing having an opening, a valve rotatably mounted in said casing and having an opening coöperating with the opening in said casing when in alinement, a pin bodily movable into the opening in the valve to lock the latter against movemnet and removable from the opening in the valve to permit the latter to be moved, a device carried by the valve and coöperating with the said pin to automatically lock the latter from being withdrawn from the opening in the valve, and a device insertible into said casing and coöperating with said locking device to release the pin, and coöperating with the latter to withdraw it from the opening in the valve.

2. In a device of the character described, in combination, a valve casing having an opening, a valve rotatably mounted in said casing and having an opening coöperating with the opening in said casing when in alinement, a pin provided with a longitudinal groove bodily movable through the opening in the casing into the opening in said valve to lock said valve in substantially fixed relation to said casing and removable from the opening in the valve to unlock the latter, means within said casing engaging said pin to lock it against removal, and means insertible into said casing and movable in the longitudinal groove of said pin to engage said locking means and release said pin and enable it to be withdrawn from the opening in the valve.

3. In a device of the character described, in combination, a valve casing having an opening, a valve within said casing having an opening capable of registering with the opening in said casing and having a second opening communicating with the first-mentioned opening in said valve, a plug carried by said valve and normally projecting into the first-mentioned opening in said valve, and a pin insertible through the opening in the casing into the first-mentioned opening in said valve and coöperating with said plug to be locked thereby.

4. In a device of the character described, in combination, a valve casing having an opening, a valve in said casing having an opening coöperating with the opening in the said casing when in alinement therewith, a device insertible into the opening in the valve through the opening in the casing to restrain movement of said valve and removable from the opening in the valve to permit movement of the latter, means carried by the valve for locking said device in its operative position, and means for releasing said locking means and for withdrawing said device from the opening in said valve to permit the latter to be turned.

5. In a device of the character described, in combination, a valve casing having an opening, a valve in said casing having an opening coöperating with the opening in the said casing when in alinement therewith, a pin capable of being inserted into said openings when the latter are in alinement and having a longitudinal and a transverse groove, a plug carried by said valve and movable into the transverse groove in said pin, and a device movable in the longitudinal groove to remove said plug from said transverse groove to unlock the pin and permit it to be withdrawn.

6. In a device of the character described, in combination, a valve casing having an opening, a valve rotatably mounted in said casing and having an opening coöperating with the opening in said casing when in alinement therewith, a device capable of being inserted into said openings when the latter are in alinement and provided with a longitudinal groove and with a transverse groove intersecting said longitudinal groove, a plug carried by said valve and movable into said transverse groove, and a device movable in the longitudinal groove to remove said plug from said transverse groove.

7. In a device of the character described, in combination, a valve casing having an opening, a valve rotatably mounted in said casing and having an opening coöperating with the opening in said casing when in alinement therewith, a device capable of being inserted into said openings when the latter are in alinement and provided with a longitudinal groove and with a transverse groove intersecting said longitudinal groove, a plug carried by said valve and movable into said transverse groove, and a key having a member movable in the longitudinal groove to remove said plug from said transverse groove and having a hooked member to engage said device and withdraw it from said openings.

8. The combination with a casing having an opening, a rotatable member in said casing having an opening and coöperating with the opening in the casing, a pin bodily movable into and out of said openings when the latter are in alinement, and means carried by the said rotatable member and coöperating with the said pin to automatically retain said pin within the opening in the rotatable member and thereby lock the pin against unauthorized removal from the opening in the rotatable member.

9. The combination with a casing having an opening, a rotatable member in said casing having an opening and coöperating with the opening in the casing, a pin bodily movable into and out of said openings when the latter are in alinement, means carried by the said rotatable member and coöperating with the said pin to automatically retain said pin within the opening in the rotatable member, and means for releasing said retaining means and for withdrawing the said pin from the opening in the rotatable member.

In testimony whereof, I have signed my name to this specification.

CHARLES A. CARTER.